United States Patent Office 3,282,642
Patented Nov. 1, 1966

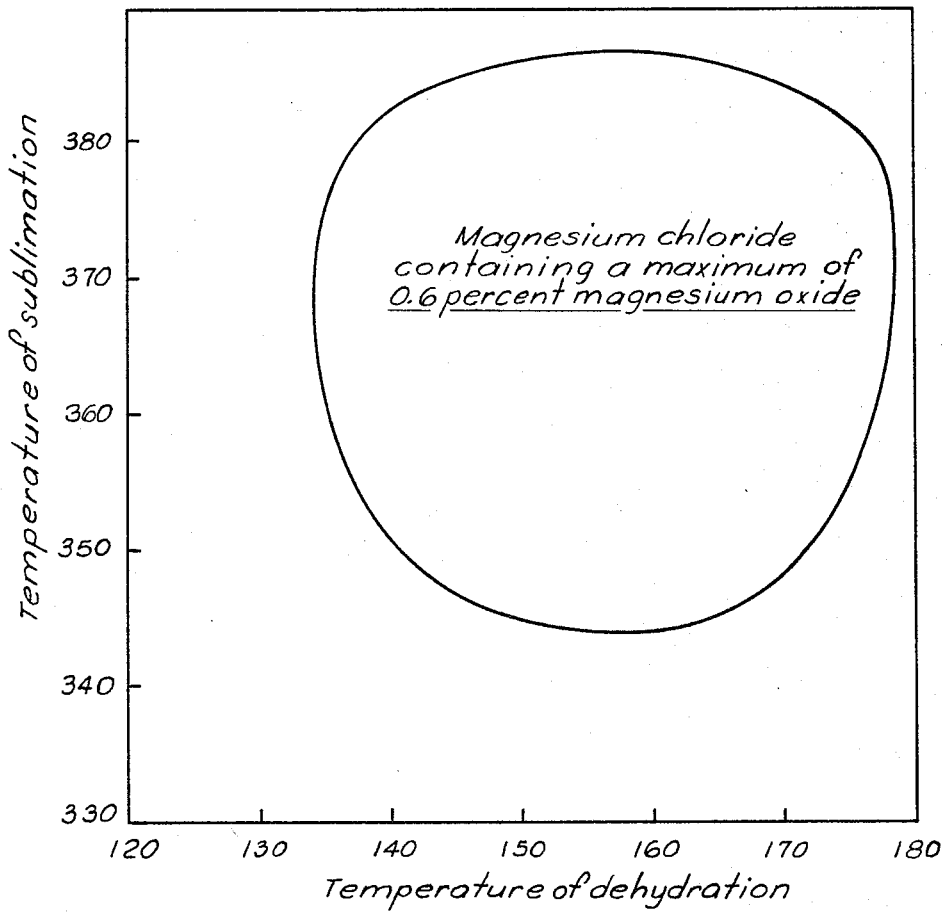

3,282,642
PREPARATION OF ANHYDROUS MAGNESIUM CHLORIDE FROM HYDROUS AMMONIUM CARNALLITE
Robert D. Goodenough and Remigius A. Gaska, Midland, Mich., assignors to The Dow Chemical Company, Midland, Mich., a corporation of Delaware
Filed Nov. 4, 1963, Ser. No. 320,994
8 Claims. (Cl. 23—91)

The present invention relates to the preparation of magnesium chloride, and, more particularly, is concerned with a method of making substantially anhydrous magnesium chloride from hydrated ammonium carnallite type compounds.

Substantially anhydrous magnesium chloride has long been known as an electrolyte in magnesium reduction cells in the manufacture of magnesium metal. Certain of these cells require the presence of less than 0.6 percent magnesium oxide and less than 0.7 percent water in the magnesium chloride used as the electrolyte. In addition, some of these cells require the presence of a fixed amount of potassium chloride in the magnesium chloride electrolyte.

It is a principal object of the instant invention to provide a novel method for preparing magnesium chloride suitable for use as an electrolyte in magnesium reduction cells which product has the desired characteristics mentioned directly hereinbefore.

Other uses, objects and advantages of the invention will become apparent from reading the detailed description disclosed hereinafter in conjunction with the accompanying drawing.

The figure of the drawing presents definitive operating temperatures of the present process for preparing substantially anhydrous magnesium chloride.

In general, the preparation of anhydrous magnesium chloride by the method of the instant invention comprises heating a hydrated ammonium carnallite type compound in a reactor within the range of from about 135° to 178° C. so as to dehydrate said carnallite type compound. Ordinarily, dehydration is carried out for a time from about 0.5 to about 24 hours, preferably for about an hour, but it is not limited to these times. The so-dehydrated compound is heated to a temperature within the range of from about 345° to about 385° C. so as to sublime ammonium chloride therefrom leaving a product of substantially anhydrous magnesium chloride. Ordinarily sublimation is carried out for a time from about 0.25 to about 5 hours or more depending upon the size and shape of the reactor and the size of carnallite charge.

In the figure, the two operating temperatures, namely temperature of dehydration and temperature of sublimation, are plotted with a smooth curve drawn through the points representing those reaction conditions which provide the maximum amounts of magnesium oxide tolerable in a substantially anhydrous magnesium chloride electrolyte cell feed stock. Within this enclosed area, any combinations of temperature of dehydration and temperature of sublimation will give less than the maximum tolerable 0.6 percent magnesium oxide and 0.7 percent water in the final product. The process can be carried out in any column or reactor equipped with a porous support plate and gas inlet and outlet ports.

Carnallite type compounds suitable for use in the method of this invention include, for example, those materials having empirical formulas corresponding to $$MgCl_2 \cdot NH_4Cl \cdot 6H_2O$$

and $$MgCl_2 \cdot xKCl \cdot yNH_4Cl \cdot 6H_2O$$

In the latter compounds, the sum of the mole fractions of the $x(KCl)$ and $y(NH_4Cl)$ equals the number of moles of $MgCl_2$. The $MgCl_2 \cdot xKCl \cdot yNH_4Cl \cdot 6H_2O$ type feed material ordinarily is used if potassium chloride is desirable in the magnesium chloride electrolyte for use in the electrolytic production of magnesium metal.

A method for preparing $MgCl_2 \cdot xKCl \cdot yNH_4Cl \cdot 6H_2O$ is described in a copending U.S. patent application, Serial No. 321,332 filed November 4, 1963, entitled "Method of Producing Solid Solutions of the Carnallite Type," by R. D. Goodenough, R. A. Gaska and R. C. Belski.

The water formed by the dehydration step and the ammonium chloride formed by the sublimation step ordinarily are removed as vapors by blowing an inert gas, i.e., sweep gas, air, nitrogen and the like, through the reactor during and after both the dehydration and sublimation stages or during and after either one of these stages. Sweep gas velocities ordinarily employed are within the range of from about 0.5 to about 10 feet per second. The term "inert gas," as used herein, refers to gases which are resistant to chemical action with magnesium chloride at the reaction temperatures. For highest product purity, the sweep gas should not contain more than 10 p.p.m. water. Larger amounts of water in the sweep gas may cause an inferior product, i.e., one containing excessive amounts of magnesium oxide and water. However, a good product can be produced at low sweep gas rates within the range set forth hereinbefore, using a sweep gas with a higher moisture content. Such practice not only lowers the total amount of water moving through the reactor, but also reduces the total volume of sweep gas to be handled.

In the dehydration stage, if the dehydration temperature is lower than the desired minimum heretofore mentioned, e.g., 120° C., and the dehydration time is less than about 45 minutes, the high residual water content carried to the sublimation step causes the magnesium chloride product to react with the water to form detrimental amounts of magnesium oxide and hydrochloric acid. In this case, the final product may contain more than the tolerable 0.6 percent magnesium oxide and 0.7 percent water desired in an electrolyte cell feed stock.

The following example is illustrative of the method of the instant invention and is in no way meant to limit it thereto.

*Example*

A feed stock of $MgCl_2 \cdot NH_4Cl \cdot 6H_2O$ was prepared by mixing reagent grade ammonium chloride and magnesium chloride hexahydrate with distilled water and heating until all the crystals were in solution. Excess water was evaporated, and the remaining solution was allowed to cool and thus precipitate $MgCl_2 \cdot NH_4Cl \cdot 6H_2O$ crystals. These crystals were then separated from the mother liquor by conventional filtration methods.

About 31.55 grams of the so produced ammonium carnallite having a composition as follows: about 36.3 percent magnesium chloride, about 20.1 percent ammonium chloride, and about 44.2 percent water, was charged to a tube reactor having an inside diameter of $1\frac{7}{16}$ inches and a length of 20 inches. The so loaded reactor was placed in a furnace.

The tube and sample were heated at a temperature of about 160° C. for 66 minutes. A dry sweep gas, namely nitrogen, containing about 3.5 p.p.m. water continuously was blown through the reactor tube at a rate of about 8 feet/second so as to remove resultant water vapor from the reactor.

Following this period, the reactor and contents were heated at a temperature of about 380° C. for 80 minutes thus causing the ammonium chloride to sublime from the reaction mass. The sweep gas was continued during this period to remove the ammonium chloride vapor.

When the reactor tube had cooled, the final product was collected in a dry box and weighed in a sealed container.

The product was found to consist of about 99.7 percent magnesium chloride, about 0.21 percent ammonium chloride, about 0.44 percent magnesium oxide and about 0.61 percent water or a total recovery of about 99.2 percent of the magnesium chloride in the starting carnallite compound.

In a similar manner to that described for the foregoing example, substantially anhydrous magnesium chloride is prepared from a feed stock of $$MgCl_2 \cdot xKCl \cdot yNH_4Cl \cdot 6H_2O$$

Various modifications can be made in the method of the present invention without departing from the spirit or scope thereof, for it is to be understood that we limit ourselves only as defined in the appended claims.

We claim:
1. The method for preparing substantially anhydrous magnesium chloride from hydrated ammonium carnallite type compounds which is comprised of:
    (a) heating in a reactor a hydrated ammonium carnallite compound to a temperature within the range of from about 135° to about 178° C. until all the water of hydration is substantially removed therefrom;
    (b) heating the so-dehydrated composition to a temperature within the range of from about 345° to about 385° C. until all the ammonium chloride is substantially sublimed and
    (c) blowing an inert sweep gas containing not more than 10 p.p.m. of water through said reactor during and after said sublimation step.
2. The method in accordance with claim 1 wherein said hydrated ammonium carnallite compound is a member selected from the group consisting of

$$MgCl_2 \cdot NH_4Cl \cdot 6H_2O \text{ and } MgCl_2 \cdot xKCl \cdot yNH_4Cl \cdot 6H_2O$$

wherein the sum of the mole fractions of the $x(KCl)$ and $y(NH_4Cl)$ equals the number of moles of $MgCl_2$.

3. The method for preparing anhydrous magnesium chloride in accordance with claim 1 including the steps of blowing an inert sweep gas containing not more than 10 p.p.m. water through said reactor during and after the dehydration step so as to substantially remove the water vapor from said reactor, and blowing said sweep gas through said reactor during and after the sublimation step so as to substantially remove ammonium chloride vapor from said reactor.

4. A method for preparing substantially anhydrous magnesium chloride from hydrated ammonium carnallite of the empirical formula $MgCl_2 \cdot NH_4Cl \cdot 6H_2O$ which is comprised of:
    (a) heating in a reactor the $MgCl_2 \cdot NH_4Cl \cdot 6H_2O$ to a temperature within the range of from about 135° to about 178° C. for a period of time of from about 0.5 to about 24 hours thereby removing substantially all the water of hydration therefrom;
    (b) heating the so-dehydrated composition to a temperature within the range of from about 345° to about 385° C. for a period of from about 0.25 to about 5 hours thereby removing substantially all of the ammonium chloride therefrom and
    (c) blowing an inert sweep gas selected from the class consisting of air and nitrogen and containing not more than 10 p.p.m. water through said reactor during and after said sublimation step.
5. The method for preparing anhydrous magnesium chloride in accordance with claim 4 including the steps of blowing an inert sweep gas as defined in said claim 4 through said reactor during and after the dehydration step so as to substantially remove the water vapor from said reactor, and blowing said sweep gas through said reactor during and after the sublimation step so as to substantially remove ammonium chloride vapor from said reactor.

6. A method for preparing substantially anhydrous magnesium chloride from hydrated ammonium carnallite of the empirical formula $MgCl_2 \cdot xKCl \cdot yNH_4Cl \cdot 6H_2O$ which is comprised of:
    (a) heating in a reactor $MgCl_2 \cdot xKCl \cdot yNH_4Cl \cdot 6H_2O$ wherein the sum of the mole fraction of $x(KCl)$ and $y(NH_4Cl)$ equals the number of moles of $MgCl_2$, to a temperature within the range of from about 135° to about 178° C. for a period of time from about 0.5 to about 24 hours thereby removing substantially all the water of hydration therefrom;
    (b) heating the so-dehydrated composition to a temperature within the range of from about 345° to about 385° C., for a period of from about 0.25 to about 5 hours thereby removing substantially all of the ammonium chloride therefrom and
    (c) blowing an inert sweep gas containing not more than 10 p.p.m. water through said reactor during and after the sublimation step.
7. The method for preparing anhydrous magnesium chloride in accordance with claim 6 including the steps of blowing an inert sweep gas selected from the class consisting of air and nitrogen and containing not more than 10 p.p.m. water through said reactor during and after the dehydration step so as to substantially remove the water vapor from said reactor, and blowing said sweep gas through said reactor during and after the sublimation step so as to substantially remove ammonium chloride vapor from said reactor.

8. The method for preparing substantially anhydrous magnesium chloride from hydrated ammonium carnallite corresponding to the empirical formula $$MgCl_2 \cdot NH_4Cl \cdot 6H_2O$$

which is comprised of:
    (a) heating in a reactor $MgCl_2 \cdot NH_4Cl \cdot 6H_2O$ to a temperature of about 380° C. for about 80 minutes removing substantially all the water of hydration therefrom;
    (b) heating the so-dehydrated composition of a temperature of about 380° C. for about 80 minutes thereby removing substantially all of the ammonium chloride therefrom;
    (c) passing substantially anhydrous nitrogen containing not more than 10 p.p.m. water through the reactor during the dehydration and sublimation stages; and
    (d) recovering substantially anhydrous magnesium chloride from said reactor.

References Cited by the Examiner
UNITED STATES PATENTS

| | | | |
|---|---|---|---|
| 1,301,766 | 4/1919 | Wallace | 23—91 |
| 1,359,652 | 11/1920 | Ashcroft | 23—91 |
| 3,181,930 | 5/1965 | Olsen | 23—91 |

OSCAR R. VERTIZ, *Primary Examiner.*

EDWARD STERN, *Examiner.*

UNITED STATES PATENT OFFICE
CERTIFICATE OF CORRECTION

Patent No. 3,282,642

November 1, 1966

Robert D. Goodenough et al.

It is hereby certified that error appears in the above numbered patent requiring correction and that the said Letters Patent should read as corrected below.

Column 4, line 45, for "380° C" read -- 160° C --; same line for "80 minutes" read -- 1 hour --; line 46, before "removing" insert -- thereby --.

Signed and sealed this 5th day of September 1967.

(SEAL)
Attest:

ERNEST W. SWIDER
Attesting Officer

EDWARD J. BRENNER
Commissioner of Patents